United States Patent
Chae et al.

(10) Patent No.: US 11,183,683 B2
(45) Date of Patent: Nov. 23, 2021

(54) PRE-LITHIATION METHOD OF NEGATIVE ELECTRODE FOR SECONDARY BATTERY

(71) Applicant: LG CHEM, LTD., Seoul (KR)

(72) Inventors: Oh Byong Chae, Daejeon (KR); Yoon Ah Kang, Seoul (KR); Jun Hyuk Song, Daejeon (KR); Eun Kyung Kim, Daejeon (KR); Sang Wook Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 88 days.

(21) Appl. No.: 16/482,062

(22) PCT Filed: Jul. 27, 2018

(86) PCT No.: PCT/KR2018/008584
§ 371 (c)(1),
(2) Date: Jul. 30, 2019

(87) PCT Pub. No.: WO2019/031744
PCT Pub. Date: Feb. 14, 2019

(65) Prior Publication Data
US 2020/0058929 A1 Feb. 20, 2020

(30) Foreign Application Priority Data

Aug. 10, 2017 (KR) .......................... 10-2017-0101505

(51) Int. Cl.
*H01M 4/00* (2006.01)
*H01M 4/139* (2010.01)
(Continued)

(52) U.S. Cl.
CPC ........... *H01M 4/139* (2013.01); *H01M 4/043* (2013.01); *H01M 4/0404* (2013.01);
(Continued)

(58) Field of Classification Search
CPC ................................ H01M 4/00; H01M 10/00
See application file for complete search history.

(56) References Cited

U.S. PATENT DOCUMENTS

| 5,743,921 | A | | 4/1998 | Nazri et al. |
| 5,759,715 | A | * | 6/1998 | Barker .................. H01M 4/667 |
| | | | | 429/331 |

(Continued)

FOREIGN PATENT DOCUMENTS

| CN | 102610861 A | 7/2012 |
| CN | 102642024 | 8/2012 |

(Continued)

OTHER PUBLICATIONS

International Search Report (PCT/ISA/210) issued in PCT/KR2018/008584, dated Nov. 1, 2018.

(Continued)

*Primary Examiner* — David P Turocy
*Assistant Examiner* — Mohammad Mayy
(74) *Attorney, Agent, or Firm* — Birch, Stewart, Kolasch & Birch, LLP

(57) ABSTRACT

A method of pre-lithiating an electrode for a secondary battery, the method including: a first step of bringing a lithium metal into direct contact with an electrode in an electrolyte and applying pressure to the electrode to prepare a pre-lithiated electrode; and a second step of removing the lithium metal and then applying pressure to the pre-lithiated electrode to perform a stabilization process. The electrode for the secondary battery after going through the pre-lithiation can relieve volume change of the electrode and reduce contact loss of the electrode.

9 Claims, 1 Drawing Sheet

(51) Int. Cl.
  *H01M 4/04* (2006.01)
  *H01M 10/0525* (2010.01)
  *H01M 4/02* (2006.01)

(52) U.S. Cl.
  CPC ..... *H01M 4/0459* (2013.01); *H01M 10/0525* (2013.01); *H01M 2004/027* (2013.01)

(56) References Cited

U.S. PATENT DOCUMENTS

| | | | |
|---|---|---|---|
| 6,200,703 B1* | 3/2001 | Kashio | H01M 4/62 429/217 |
| 8,999,584 B2 | 4/2015 | Jiang et al. | |
| 2006/0035137 A1* | 2/2006 | Maruo | H01M 2/1626 429/324 |
| 2013/0284988 A1 | 10/2013 | Satake et al. | |
| 2014/0310951 A1 | 10/2014 | Grant et al. | |
| 2015/0017543 A1 | 1/2015 | Lee et al. | |
| 2015/0333385 A1 | 11/2015 | Sun et al. | |
| 2016/0141596 A1* | 5/2016 | Uhm | H01M 4/587 429/220 |
| 2016/0181594 A1* | 6/2016 | Balogh | H01M 4/139 156/247 |
| 2016/0181612 A1* | 6/2016 | Lee | H01M 4/366 429/231.8 |
| 2016/0260967 A1 | 9/2016 | Matus et al. | |
| 2017/0098856 A1* | 4/2017 | Zhamu | H01M 4/525 |

FOREIGN PATENT DOCUMENTS

| | | |
|---|---|---|
| CN | 102856532 A | 1/2013 |
| CN | 103119758 A | 5/2013 |
| CN | 104584278 A | 4/2015 |
| CN | 105190958 A | 12/2015 |
| CN | 105304856 A | 2/2016 |
| JP | 2-309558 A | 12/1990 |
| JP | 2002-237560 A | 8/2002 |
| JP | 2006-156351 A | 6/2006 |
| JP | 2006-216451 A | 8/2006 |
| JP | 2012-227123 A | 11/2012 |
| JP | 2014-175155 A | 9/2014 |
| JP | 2015-138619 A | 7/2015 |
| JP | 2015-534242 A | 11/2015 |
| KR | 10-1999-0086308 A | 12/1999 |
| KR | 10-0291067 B1 | 6/2001 |
| KR | 10-2006-0056969 A | 5/2006 |
| KR | 10-2008-0025023 A | 3/2008 |
| KR | 10-1064821 B1 | 9/2011 |
| KR | 10-2011-0122861 A | 11/2011 |
| KR | 10-1162794 B1 | 7/2012 |
| KR | 10-2012-0092529 A | 8/2012 |
| KR | 10-1397415 B1 | 5/2014 |
| KR | 10-2015-0089966 A | 8/2015 |
| KR | 10-2015-0093874 A | 8/2015 |
| KR | 10-2015-0110797 A | 10/2015 |
| WO | WO 96/27910 A1 | 9/1996 |

OTHER PUBLICATIONS

Zhang et al., "Electrochemomechanical degradation of high-capacity battery electrode materials", Progress in Materials Science, 2017 (available online Apr. 29, 2017), vol. 89, pp. 479-521 (43 pages).
Japanese Office Action dated Sep. 23, 2020 of corresponding Japanese Patent Application No. 2019-542545 with English Translation.
Indian Office Action dated Aug. 16, 2021 for IN Patent Application No. 201917032903.

* cited by examiner

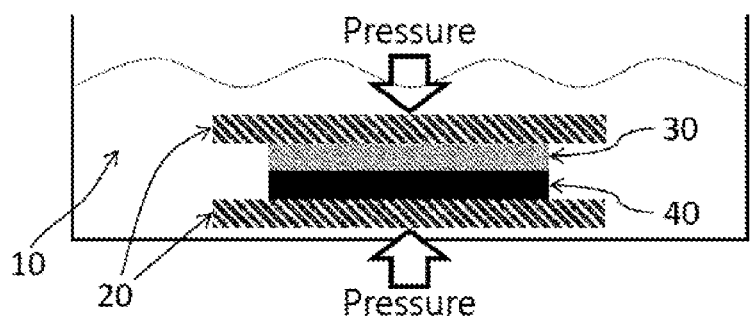
Step 1
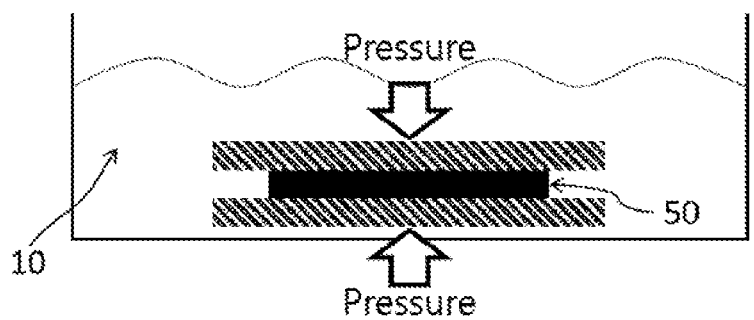
Step 2

PRE-LITHIATION METHOD OF NEGATIVE ELECTRODE FOR SECONDARY BATTERY

TECHNICAL FIELD

This application claims the benefit of priority based on Korean Patent Application No. 10-2017-0101505, filed on Aug. 10, 2017, and the entire contents of the Korean patent application are incorporated herein by reference.

The present invention relates to a method for pre-lithiating a negative electrode for a secondary battery, and more particularly, to a method for pre-lithiating a negative electrode in which, in the step before assembling a lithium secondary battery, the negative electrode is immersed in the electrolyte and wetted, then lithium metal was brought into direct contact with the negative electrode to apply pressure to the lithium metal to be pre-lithiated, then the negative electrode is pressed at high pressure during the stabilization (aging) time after removing the lithium metal.

BACKGROUND ART

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

Generally, in order to prepare a secondary battery, first, a positive electrode and a negative electrode are formed by applying an active material to a surface of a current collector, then a separate is interposed therebetween to thereby make an electrode assembly, which is then mounted in a cylindrical or rectangular metal can or inside a pouch-type case of an aluminum laminate sheet, and a liquid electrolyte in injected or impregnated into the electrode assembly or a solid electrolyte to prepare a secondary battery.

In general, the negative electrode of a lithium secondary battery uses a carbon material such as graphite, but the theoretical capacity density of carbon is 372 mAh/g (833 mAh/cm3). Therefore, in order to improve the energy density of the negative electrode, silicon (Si), tin (Sn), oxides and alloys thereof which are alloyed with lithium are considered as negative electrode materials. Among them, silicon-based materials have attracted attention due to their low cost and high capacity (4200 mAh/g).

However, the silicon has a problem in that volume change (shrinkage or expansion) occurs during the insertion/removal of lithium ions, resulting in deterioration of mechanical stability, and as a result, cycle characteristics are impaired. Therefore, it is necessary to develop a material having structural stability, which is excellent in stability when used as an active material of an electrochemical device, and capable of ensuring cycle characteristics.

In addition, when the silicon-based negative electrode active material is used, the initial irreversible capacity becomes large. During charging and discharging of the lithium secondary battery, lithium discharged from the positive electrode is inserted into the negative electrode at the time of charging, and is discharged from the negative electrode at the time of discharging and returns to the positive electrode. In the case of the silicon negative electrode active material, a large amount of lithium inserted into the negative electrode does not return to the positive electrode at the time of initial charging and thus the initial irreversible capacity becomes large. When the initial irreversible capacity increases, there occurs a problem that the battery capacity and the cycle are rapidly reduced.

In order to solve the above problems, a method of pre-lithiaing a negative electrode including a silicon-based negative electrode active material is known. As a pre-lithiation method, known methods include a method of producing an electrode by lithiating a negative electrode active material by a physicochemical method and a method of electrochemically pre-lithiating a negative electrode.

However, even after lithiation, there may be a volume change as lithium ions migrate through the diffusion in the negative electrode, and this volume change can reduce the capacity and cycle of the battery. Therefore, there is a need for development of a technology for minimizing the volume change after pre-lithiation.

DISCLOSURE

Technical Problem

It is an object of the present invention to provide a pre-lithiation method for minimizing a volume change of an electrode after pre-lithiation and a secondary battery and an electrode for the secondary battery which are prepared according to the method.

Technical Solution

The present invention provides a method of pre-lithiating an electrode for a secondary battery, the method including: a first step of bringing a lithium metal into direct contact with an electrode in an electrolyte and applying pressure to the electrode to prepare a pre-lithiated electrode; and a second step of removing the lithium metal and then applying pressure to the pre-lithiated electrode to perform a stabilization process.

According to an example of the present invention, in the first step, the lithium metal may be placed on the electrode and a jig may be tightened to apply pressure to the electrode. According to an example of the present invention, a pressure applied in the second step may include tightening the pre-lithiated electrode on a jig to apply pressure.

According to an example of the present invention, the electrode may be a negative electrode.

According to an example of the present invention, the electrode may include silicon oxide.

According to an example of the present invention, the pressure applied in the first step may be in a range of 20 to 50 kgf and the pressure applied in the second step may be in a range of 20 to 50 kgf.

According to an example of the present invention, the pressure applied to the electrode and the lithium metal in the first step may be for 0.1 to 10 hours.

According to an example of the present invention, the pressure applied to the electrode in the second step may be for 0.5 to 10 hours.

According to an example of the present invention, the method may further include wetting the electrode by immersing the electrode in an electrolyte before the first step.

According to an example of the present invention, the electrode may be wetted with the electrolyte for 1 to 48 hours.

According to an example of the present invention, the second step may be performed in an electrolyte.

Further, the present invention provides a method of preparing an electrode for a secondary battery, the method including: mixing an electrode active material, a conductive material and a binder to prepare a slurry; coating the slurry on an electrode current collector; pressing the coated electrode current collector with a roller and punching the electrode current collector to prepare unit electrodes and drying the unit electrodes; and pre-lithiating the dried unit electrodes according to the methods for pre-lithiating an electrode for a secondary battery disclosed herein, and an electrode and a secondary battery which are prepared according to the method.

Advantageous Effects

The electrode for a secondary battery which has undergone the pre-lithiation step provided in the present invention has the effect of alleviating the volume change of the electrode, thereby reducing the contact loss of the electrode.

The electrode manufactured by applying the pre-lithiation method of the present invention has an effect of improving the cycle performance as the contact loss of the electrode is reduced.

The secondary battery of the present invention has an excellent capacity retention rate because an electrode having improved cycle performance is applied.

BRIEF DESCRIPTION OF THE DRAWINGS

The FIGURE is a schematic diagram showing a pre-lithiation step (first step) and a stabilization step (second step) according to the present invention.

DETAILED DESCRIPTION OF THE PREFERRED EMBODIMENTS

Hereinafter, the present invention will be described in detail. The present invention is not limited by the following examples and experimental examples. The embodiments according to the present invention may be modified into various other forms, and the scope of the present invention should not be construed as being limited to the embodiments described below. The embodiments of the present invention are provided to more fully describe the present invention to those skilled in the art.

The pre-lithiation of the electrode for a secondary battery according to the present invention includes a first step of directly pre-lithiating by allowing a lithium metal to directly contact an electrode in an electrolyte solution and applying pressure thereto; and a second step of separating the lithium metal and then performing a stabilization process by applying pressure to the pre-lithiated electrode.

Referring to the FIGURE, in the first step of the pre-lithiation of the present invention, lithium metal is directly contacted to the electrode in the electrolyte solution and pressure is applied thereto. Lithium metal is placed on the electrode, and a constant force is applied to the electrode at the top and bottom to allow the electrode to directly contact the lithium metal to thereby perform pre-lithiation. The direct contact between the electrode and the lithium metal allows the lithium to enter the space between the electrodes similarly to the initial irreversible state, and the irreversible state is less likely to occur in the subsequent charge by the space, thereby allowing the initial irreversible level to be controlled.

The electrolytic solution for carrying out the pre-lithiation process of the present invention is not limited in its kind as long as the lithium salt is dissolved in a solvent and promotes side reactions to be experienced when the electrode is initially charged. Examples of the lithium salt include one or more selected from the group consisting of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, and lithium 4-phenylborate, and examples of the solvent include one or a mixture of two or more selected from the group consisting of propylene carbonate, ethylene carbonate, butylene carbonate, dimethyl carbonate, diethyl carbonate, ethyl methyl carbonate, gamma-butylolactone, and 1,2-dimethoxyethane.

In the first step, the lithium metal preferably covers an entire area of the electrode, and a method of applying a force to the lithium metal is not limited. The lithium metal is placed on the electrode and the jig is tightened, so that the pressure can be applied toward the center from above and below the contact surface of the electrode and the lithium metal. It is also possible to apply a pressure to the contact surface between the electrode and the lithium metal by using a press machine or the like.

The pressure applied for the pre-lithiation of the first step may be 20 to 50 kgf, preferably 25 to 45 kgf, most preferably 30 to 40 kgf. In the case of less than 20 kgf, the pre-lithiation does not occur sufficiently, and the initial irreversible reaction occurs largely, and the volume expansion is not suppressed during the whole lithiation process, which makes the contact between the active materials undesirable. Further, when it exceeds 50 kgf, the lithiation may proceed excessively and the electrode capacity may be reduced, and the excessive pressure may be applied to the electrode, so that the active material damage may occur.

Further, in the pre-lithiation in the first step, the time for applying the pressure to the electrode and the lithium metal may be 0.1 to 10 hours, more preferably 0.3 to 5 hours, and most preferably 0.5 to 3 hours.

In the present invention, the electrode may be wetted by immersing the electrode in the electrolytic solution before performing the pre-lithiation in the first step. Due to the wetting, the volume of the electrode expands to a certain extent, and the distance between the electrode active material particles increases appropriately, so that the electrolyte penetrates deeply between the particles. Therefore, the contact area between the electrolyte and the electrode is increased, so that lithium ions can penetrate into the electrode more easily by direct contact.

The wetting is preferably 1 hour to 48 hours, more preferably 3 hours to 30 hours, and most preferably 5 hours to 20 hours. In case of wetting less than 1 hour, the negative electrode may not expand sufficiently and electrolyte may not penetrate deeply into the negative electrode sufficiently, so that the pre-lithiation due to direct contact at a later step may not occur sufficiently. When wetting is performed for more than 48 hours, the electrode is exposed to the electrolyte for too long, resulting in poor shape stability and deterioration of the adhesive strength of the electrode, which reduces the cell balance.

In the second step of the present invention, the lithium metal deposited on the electrode is removed, and the negative electrode is stabilized by applying pressure to the pre-lithiated negative electrode. Even if the electrode is subjected to the pre-lithiation process, there may be a change in the volume of the electrode as the lithium ion moves through the diffusion in the electrode. Such a change in volume increases the irreversible capacity of the electrode, and thus in the present invention, a stabilization step of applying pressure to the electrode is performed in order to further mitigate the volume change of the electrode.

The pressure applied to the electrode during the stabilization process is preferably 20 to 50 kgf, more preferably 25 to 45 kgf, and most preferably 30 to 40 kgf. If it is less than 20 kgf, the pre-lithiation does not sufficiently take place, and the initial irreversible state significantly occurs which is undesirable. If it exceeds 50 kgf, the pre-lithiation proceeds excessively, which may cause a decrease in the electrode capacity. The method of applying the pressure to the pre-lithiated electrode may be performed by using a press machine or by a method of fastening the pre-lithiated electrode to the jig.

The stabilization process may be performed in an electrolytic solution. Further, the time for applying the pressure to the electrode in the stabilization step is preferably 0.5 to 10 hours, more preferably 1 to 8 hours, and most preferably 2 to 6 hours. If the time for applying the pressure in the stabilization step is less than 0.5 hour, it is difficult to achieve the object of the present invention, and if it exceeds 10 hours, the shape stability of the electrode may be deteriorated.

The pre-lithiation method of the present invention can be applied to a negative electrode for a secondary battery. In particular, in order to increase the capacity density of a negative electrode using a carbon material such as graphite, it is preferable to apply the pre-lithiation method of the present invention to the negative electrode using silicon and oxides thereof as its main material.

The silicon oxide has a theoretical capacity density of 4200 mAh/g, which is much higher than the theoretical capacity density of carbon material of 372 mAh/g. Therefore, it can be suitably used as a negative electrode for a secondary battery, but since its shape stability is low, the initial irreversible capacity is large and there is a risk of reduction of the electrode capacity or a collapse of the cell balance, and thus a pre-lithiation process as in the present invention is necessary.

The present invention is also characterized in that it provides a method of manufacturing an electrode including a process of pre-lithiation by the above-described method. A method of manufacturing an electrode according to the present invention includes: mixing an electrode active material, a conductive material and a binder to prepare a slurry; coating the mixed slurry on an electrode current collector; pressing the coated electrode current collector with a roller and punching toe electrode current collector to generate unit electrodes and drying the unit electrodes; and pre-lithiating the dried unit electrodes according to the pre-lithiation method.

Except for the pre-lithiation step, it is the same as the conventional method for manufacturing a negative electrode for a secondary battery. Therefore, the step of pre-lithiation can be easily added to the existing process, and since the added process itself is simple, the cost increase is not significant, which is an advantage. In addition, the conventional physicochemical method has a disadvantage of fire and explosion because it is carried out at a high temperature, and the electrochemical method is difficult to homogenize and the cost is greatly increased. However, the lithiation method according to the present invention is advantageous in that the cost increase is relatively small and the lithiation can be performed relatively safely and uniformly, and the pre-lithiated electrode is stabilized to thereby minimize the volume change of the electrode. Therefore, the effect of reducing the initial irreversible capacity as compared with the electrode by the conventional direct contact type lithiation method and the capacity retention rate is further improved.

The present invention also provides a secondary battery including a negative electrode manufactured by the above-described method.

The secondary battery according to the present invention includes an electrode assembly in which two electrodes of different polarities are stacked in a state separated from each other by a separator. The electrode assembly includes a positive electrode including a positive electrode active material, a negative electrode including a negative electrode active material, and a separator.

Specifically, the positive electrode, for example, may be prepared by applying a mixture of a positive electrode active material, a conductive material and a binder on a positive electrode current collector, followed by drying. If necessary, a filler may be further added to the mixture.

The positive electrode active material according to the present invention may be mixed with a compound, which uses a lithium intercalation material as its main component, such as a layered compound such as lithium cobalt oxide ($LiCoO_2$), lithium nickel oxide ($LiNiO_2$), or a compound substituted with one or more transition metals; lithium manganese oxides such as $Li_{11x}Mn_{2-x}O_4$(herein, x is between 0 and 33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; lithium nickel oxide expressed by $LiNi_{1-x}M_xO_2$ (herein, M=Co, Mn, Al, Cu, Fe, Mg, B or Ga, and x=0.01 to 0.3); lithium manganese composite oxide expressed by $LiMn_{2-x}M_xO_2$ (herein, M=Co, Ni, Fe, Cr, Zn or Ta, x 32 0.01 to 0.1) or $Li_2Mn_3MO_8$ (herein, M=Fe, Co, Ni, Cu or Zn); $LiMn_2O_4$ in which a part of Li in the formula is substituted with an alkaline earth metal ion; disulfide compound; and $Fe_2(MoO_4)_3$ or a compound oxide formed by combination thereof.

The positive electrode current collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The conductive material is usually added in an amount of 1 to 50% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive oxides such as titanium oxide; and conductive materials such as polyphenylene derivatives and the like.

The binder is added in an amount of 1 to 50% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of a positive electrode, and is not particularly limited as long as it is a fibrous material without causing a chemical change in the battery. Examples of the filler include olefin polymers such as polyethylene and polypropylene; fibrous materials such as glass fibers and carbon fibers.

Further, the negative electrode may be formed by coating a negative electrode material on a negative electrode collector and drying the negative electrode active material. The negative electrode may further include the above-described components.

The negative electrode current collector is generally made to a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

As the negative electrode active material of the present invention, a material capable of reversibly adsorbing/discharging lithium ions such as silicon (Si) and tin may be used. As long as such a material is used, it is possible to exhibit the effects of the present invention in any of composite, alloy, compound, solid solution and composite negative electrode active material including silicon-containing material and tin-containing material. As the silicon-containing material, Si, $SiO_x$ (0.5<x<2.0) or an alloy, a compound or a solid solution which is generated by substituting part of Si or Si contained in SiOx with at least one element selected from the group consisting of B, Mg, Ni, Ti, Mo, Co, Ca, Cr, Cu, Fe, Mn, Nb, Ta, V, W, Zn, C, N, and Sn may be used.

These materials may constitute a negative electrode active material alone or may constitute a negative electrode active material by a plurality of kinds of materials. Examples of constituting the negative electrode active material by the plural kinds of materials include a compound containing Si, oxygen and nitrogen, a composite of a plurality of compounds containing Si and oxygen and having different composition ratios of Si and oxygen, and the like. Among these, SiOx (0.5<; x<2.0) is preferable because the discharge capacity density is large and the expansion ratio at the time of filling is smaller than that of Si.

It is possible to use a commonly known polyolefin separator or a composite separator in which an organic and inorganic composite layer is formed on the olefin based material, as a separator for insulating the electrodes between the positive electrode and the negative electrode, and the present invention is not limited to these examples.

The electrolyte injected into the secondary battery is a lithium salt-containing non-aqueous electrolyte, which is composed of a nonaqueous electrolyte and lithium. As the non-aqueous electrolyte, a non-aqueous electrolyte, a solid electrolyte, an inorganic solid electrolyte and the like are used.

Examples of the non-aqueous electrolyte include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymer including an ionic dissociation group, and the like.

Examples of the inorganic solid electrolyte include nitrides, halides, and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a substance that is soluble in the non-aqueous electrolyte. The examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlC_{14}$, $CH_3SO_3Li$, $CF_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N-substituted imidazolidine, ethylene glycol dialkyl ether, ammonium salt, pyrrole, 2-methoxyethanol, aluminum trichloride, etc. may be added to the non-aqueous electrolyte. In some cases, a halogen-containing solvent such as carbon tetrachloride or ethylene trifluoride may be further added to impart nonflammability, or a carbon dioxide gas may be further added to improve high temperature storage characteristics.

Hereinafter, the present invention will be described in more detail through examples below. However, the following Examples and Experimental Examples are provided for illustrating the present invention, and the scope of the present invention is not limited by these Examples and Experimental Examples.

Example 1

<Preparation of Negative Electrode>

92 wt % of negative electrode active material (graphite: SiO=7:3), 3 wt % of Denka Black (conductive material), 3.5 wt % of SBR (binder) and 1.5 wt % of CMC (thickener) were added to water as the negative electrode active material, to thereby prepare a negative electrode mixture slurry.

The negative electrode mixture slurry was coated on one side of the copper collector, dried and rolled, and then punched to a predetermined size to produce a negative electrode.

<High Pressure, Direct Contact Pre-Lithiation>

As shown in the FIGURE, the negative electrode prepared above was wetted for 10 hours in an electrolyte (an electrolyte which is generated by dissolving 1M lithium hexafluorophosphate ($LiPF_6$) in a solvent that is generated by mixing ethylene carbonate (EC) with ethyl methyl carbonate (DEC) by the volume ratio of 50:50), then the lithium metal is disposed on the negative electrode in a state that there is the electrolyte, and a jig is tightened to be pressed by a force of 30 kgf. After 30 minutes of lithiation, the lithium metal is removed.

<High Pressure Stabilization>

As shown in the FIGURE, the above-prepared pre-lithiated negative electrode is tightened to the jig again and pressed for 2 hours under a force of 30 kgf to allow the stabilization process to proceed.

<Preparation of Lithium Secondary Battery>

A polyolefin separator was interposed between the negative electrode and $LiCoO_2$ as counter electrode, and an electrolyte which is generated by dissolving 1M $LiPF_6$ in a solvent generated by mixing ethylene carbonate (EC) and ethyl methyl carbonate (DEC) by a volume ratio of 50:50, to thereby prepare a coin-type full-cell.

Example 2

Secondary battery was produced under the same conditions as in Example 1, except that the pressure applied in the lithiation and stabilization step was changed to 20 kgf.

Example 3

A secondary battery was manufactured under the same conditions as in Example 1, except that the electrode was pressed for 3 hours in the high-voltage stabilization step.

Example 4

A secondary battery was manufactured under the same conditions as in Example 1 except that a negative electrode and a lithium metal were pressed for 1 hour at the high-voltage direct contact lithiation step.

Example 5

The secondary battery was manufactured under the same conditions as in Example 1, except that the wetting time of the electrode was changed to 15 hours at the high voltage direct contact lithiation step.

Comparative Examples 1 to 4

A secondary battery was manufactured under the same conditions as in Example 1, except that the pressing force at the time of lithiation, the wetting time of the electrode, and the pressing force at the time of stabilization were changed as shown in Table 1.

1. Measurement of Electrode Thickness

The thickness of the negative electrode prepared above was measured using a height measuring device and the result about the increase of the thickness compared to the initial time is shown in Table 1.

2. Measurement of Capacity Retention Rate

The coin-type full-cell thus prepared was subjected to a charge/discharge reversibility test using an electrochemical charge/discharge device, and the capacity retention rate is shown in Table 1. During charging, the battery was charged at a current density of 0.1 C-rate up to a voltage of 4.2 V (vs. Li/Li+), and discharged to a voltage of 2.5 V at the same current density during discharging.

TABLE 1

| | Wetting time of electrode (hours) | Press force at pre-lithiation (kgf) | Pre-lithiation time (hours) | Press force at stabilization (kgf) | stabilization time (hours) | Increase rate of electrode thickness after pre-lithiation (%) | 100 cycle capacity retention rate (%) |
|---|---|---|---|---|---|---|---|
| Example 1 | 10 | 30 | 0.5 | 30 | 2 | 31 | 88 |
| Example 2 | 10 | 20 | 0.5 | 20 | 2 | 33 | 86 |
| Example 3 | 10 | 30 | 0.5 | 30 | 3 | 29 | 90 |
| Example 4 | 10 | 30 | 1 | 30 | 2 | 37 | 85 |
| Example 5 | 15 | 30 | 0.5 | 30 | 2 | 32 | 88 |
| Comparative example 1 | 10 | 30 | 0.5 | 0 | 2 | 43 | 77 |
| Comparative example 2 | 10 | 1 | 0.5 | 0 | 2 | 51 | 68 |
| Comparative example 3 | 10 | 1 | 0.5 | 30 | 2 | 47 | 75 |
| Comparative example 4 | 0 | 30 | 0.5 | 30 | 2 | 39 | 73 |

In the case of the embodiment in which the compression was strong during the pre-lithiation and stabilization, the thickness change after the pre-lithiation was smaller than that in the comparative example. The negative electrode was used to make a full cell and a cycle test was performed, and as a result of the test, the capacity retention rate up to 100 cycles was also measured higher than the comparative example.

Generally, lithiation and stabilization causes lithium ions to enter the negative electrode, causing the volume of the active material to expand, causing the contact between the particles to drop, which causes the electrical contact to drop. However, as in the case of the embodiment of the present invention, when strong pressure is applied during the pre-lithiation and stabilization, the contact loss between particles due to the volume change is not greatly reduced. Therefore, it is seen that when the battery is manufactured using such an electrode and subjected to a cycle test, the capacity retention rate is increased.

While the present invention has been particularly shown and described with reference to exemplary embodiments thereof, it is to be understood that the present invention is not limited to the disclosed exemplary embodiments, and various changes and modifications may be made without departing from the technical idea of the present invention and the scope of the appended claims.

DESCRIPTION OF SYMBOLS

10: electrolyte
20: jig
30: lithium metal
40: electrode
50: pre-lithiated electrode

The invention claimed is:

1. A method of pre-lithiating an electrode for a secondary battery, the method comprising:
 a first step of bringing a lithium metal into direct contact with an electrode in an electrolyte and applying pressure to the electrode and the lithium metal for 0.5 to 3 hours to prepare a pre-lithiated electrode; and
 a second step of removing the lithium metal and then applying pressure to the pre-lithiated electrode for 2 to 6 hours for perform a stabilization process; wherein the pressure applied in the first step is in a range of 20 to 50 kgf and the pressure applied in the second step is in a range of 20 to 50 kgf.

2. The method of claim 1, wherein the first step comprises placing the lithium metal on the electrode and tightening a jig to apply pressure to the lithium metal and electrode.

3. The method of claim 1, wherein the applying pressure of the second step comprises tightening the pre-lithiated electrode on a jig to apply pressure.

4. The method of claim 1, wherein the electrode is a negative electrode.

5. The method of claim 1, wherein the electrode comprises silicon oxide.

6. The method of claim 1, further comprising wetting the electrode by immersing the electrode in an electrolyte before the first step.

7. The method of claim 6, wherein the electrode is wetted with the electrolyte for 1 to 48 hours.

8. The method of claim 1, wherein the second step is performed in an electrolyte.

9. A method of preparing an electrode for a secondary battery, the method comprising:
 mixing an electrode active material, a conductive material and a binder to prepare a slurry;
 coating the slurry on an electrode current collector;
 pressing the coated electrode current collector with a roller and punching the electrode current collector to prepare unit electrodes and drying the unit electrodes; and
 pre-lithiating the dried unit electrodes according to the pre-lithiation method according to claim 1.

* * * * *